June 3, 1924.

E. C. HEAD 1,496,221

METHOD AND APPARATUS FOR CUTTING HERRINGBONE GEARS

Filed Jan. 23, 1922   3 Sheets-Sheet 1

INVENTOR.
Ernest C. Head
BY Harold E. Stonebraker,
his ATTORNEY

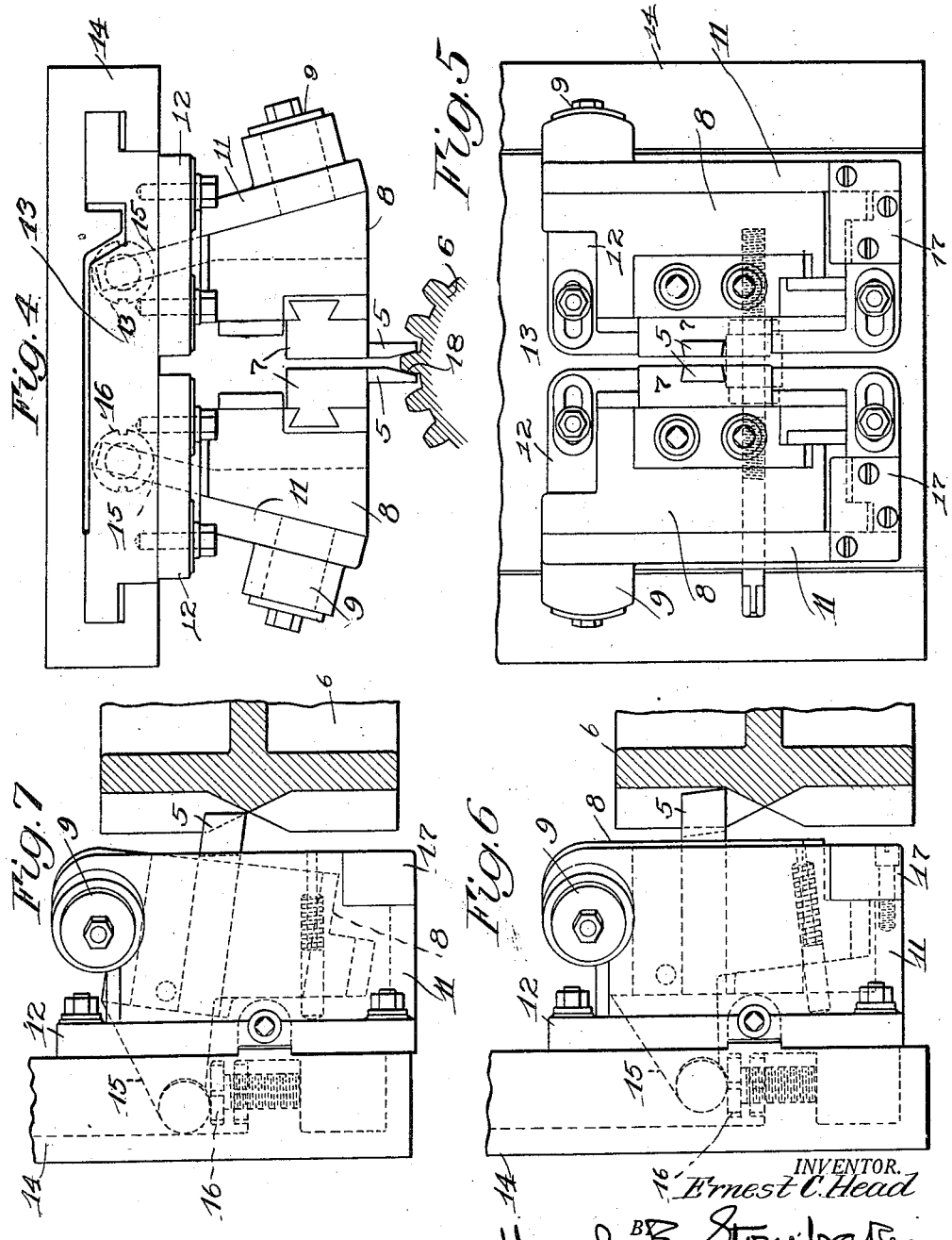

June 3, 1924.

E. C. HEAD 1,496,221

METHOD AND APPARATUS FOR CUTTING HERRINGBONE GEARS

Filed Jan. 23, 1922

INVENTOR.
Ernest C. Head
BY Harold E. Stonebraker
his ATTORNEY

Patented June 3, 1924.

1,496,221

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

METHOD AND APPARATUS FOR CUTTING HERRINGBONE GEARS.

Application filed January 23, 1922. Serial No. 531,107.

*To all whom it may concern:*

Be it known that I, ERNEST C. HEAD, a citizen of the United States of America, residing at Rochester, in the county of Monroe and State of New York, have invented certain new and useful Improvements in Methods and Apparatus for Cutting Herringbone Gears, of which the following is a specification.

This invention relates to a method and apparatus for cutting herringbone gears, and has for its object the production of a gear of maximum efficiency, in which the teeth extend from the edges of the gear face to the center thereof, and are effective throughout their entire lengths.

A further purpose of the invention is to provide a method and means for cutting a herringbone gear of this nature in a practicable and economical way, making it feasible to turn out such gears in large quantities.

A more particular purpose of the invention is to provide for cutting herringbone gears in which the teeth are of decreased depth toward the center of the gear face, while the curvature and thickness of each tooth remains uniform throughout the body portion of normal depth and the end portion of decreasing depth, whereby proper contact is maintained between teeth of intermeshing gears clear to the center of the gear faces.

With these and other ends in view, the invention comprises the method and mechanism that will appear more clearly from the following description, in conjunction with the accompanying drawings, the novel features being pointed out in the claims following the specification.

In the drawings:

Figure 4 is an end elevation of a mechanism illustrating one application of the invention to a generating gear planer;

Figure 5 is a bottom plan view of the parts illustrated in Figure 4;

Figure 6 is a side elevation, showing the position of the parts as the tool commences to swing outwardly from the deepest portion of the tooth;

Figure 7 is a similar view showing the position of the parts after the tool has completed its outward swinging motion, and prior to its return to starting position;

By the invention herein disclosed, it is possible to cut a herringbone gear of the form set forth in co-pending application Serial No. 531,105, filed January 23, 1922, and the method which will hereinafter be described may be carried out on a planing machine, either of the generating or former type, or on a hobbing machine, as set forth in co-pending application Serial No. 531,106, filed January 23, 1922, or on any other suitable apparatus.

Figure 1:
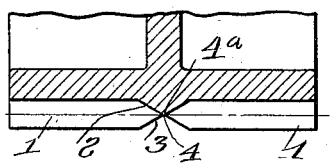
Figure 1 is a sectional view of a herringbone spur gear made in accordance with the invention.
Figure 2:
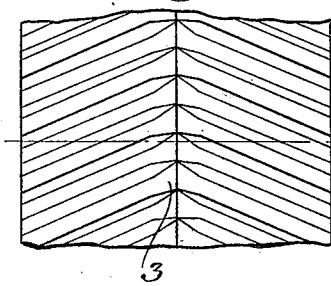
Figure 2 is a plan view of a portion of the gear face.
Figure 3:
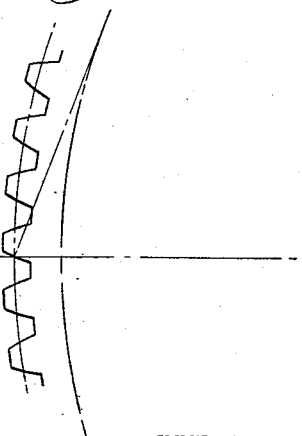
Figure 3 is a side elevation of the gear.

In general, the invention consists in forming a tooth of the character illustrated in Figure 1, by moving a tool parallel to the gear face to form the body portion 1 of uniform depth, and swinging the tool outwardly toward the gear face along the line 2, as it approaches the center of the gear face, thereby producing an end portion 3 on the tooth of gradually decreasing depth.

In order to maintain the same curvature of tooth profile, and uniform thickness of tooth, both in the body portion and reduced end portion, the parts are arranged so that the outward swinging movement of the tool, as it approaches the center of the gear face, is about an axis perpendicular to the cutting edge of the tool, and this relation can be maintained either in a hobbing machine, as in the co-pending application already referred to, or in a planing machine, the difference between the two operations being that in the planing machine, where the tool initially travels in a straight line and is then swung outwardly, the surface 2 may or may not be straight, according to the swinging motion of the tool. Whereas with the hobbing machine, the hob is caused to traverse the gear face until its final cut takes place at the center of the gear face, and the surface 2 necessarily follows the path of travel of the hobbing cutters and is therefore curved. The gear face is cut away by any suitable mechanism at 4 to afford an opening corresponding to the enlargement 4ª, and permit intermeshing of mating gears.

There are various ways in which the method can be applied to planing machines of the generating type, and an illustration of such an embodiment is found in Figures 4 to 7 inclusive, in which 5 designate each of two planing tools arranged to cut on opposite sides of a tooth of a gear 6, said tools being mounted in suitable tool holders 7 which are attached to the pivoted blocks 8. The blocks 8 are pivoted in the bearings 9 which are formed on brackets 11 carried by plates 12. The plates 12 are secured to a slide 13, which is reciprocated in the guide 14.

Reciprocating motion may be imparted to the slide 13 to impart the necessary cutting motion to the tools in any suitable manner, as well known in the art, causing the tools to travel back and forth lengthwise of a tooth, and in order to swing the tools outwardly toward the gear face during the latter part of such endwise cutting motion, the blocks 9 are provided with suitable arms or extensions 15 which, during the lengthwise travel, engage stationary abutments 16, here shown in the form of adjustable posts, while 17 are abutments against which the tool blocks engage to hold the tools into cutting contact with the blank, up to the time of the outward swinging motion.

As the tool slide 13 travels from the outer edge of the gear face toward the center thereof, the tools cut in a line parallel to the gear face until the arms 15 strike the abutments 16, as shown in Figure 6, and then the tool blocks swing outwardly during the continued cutting action of the tools, the final cutting position being illustrated in Figure 7. As the tools move from the position of Figure 6 to that of Figure 7, the end portion of the tooth is produced of gradually reduced depth. In order to maintain uniformity of the tooth curvature and thickness throughout both the body portion and the reduced end portion, the cutting edges 18 of the tools are arranged perpendicularly to the swinging axes of the blocks 9, about which the tools pivot in their outward swinging travel. With this type of mechanism, a herringbone gear with a tooth such as described, can be generated by providing the gear blank and tools with suitable relative generating or rolling motions, as well known in the art.

Figure 10:
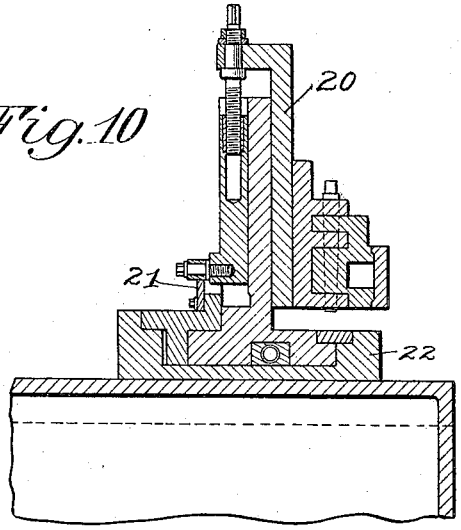
Figure 10 is a vertical sectional view.
Figure 9:
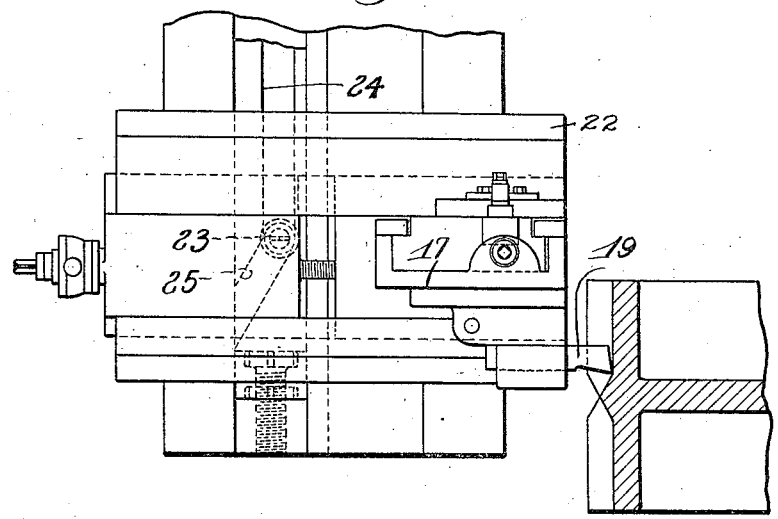
Figure 9 is a side elevation of the same.
Figure 8:
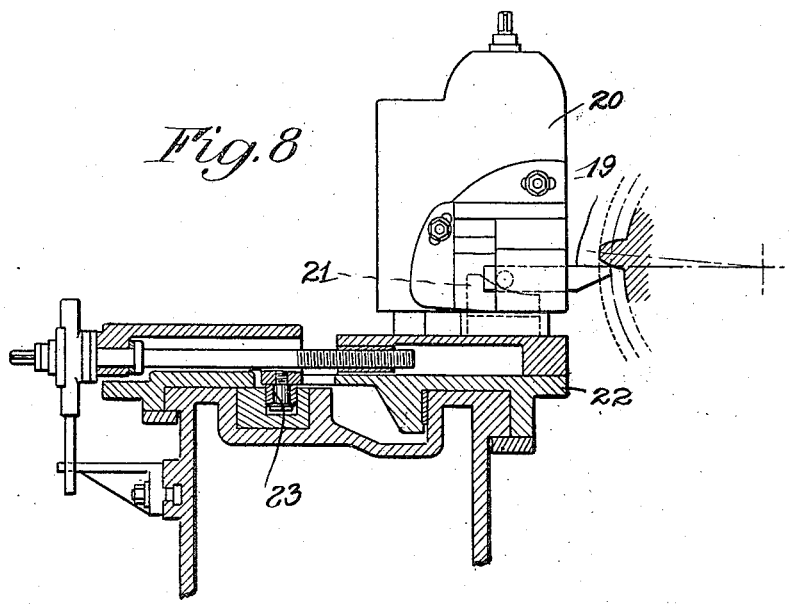
Figure 8 is an end elevation of a mechanism embodying another application of the invention to a former type of gear planing machine.

In adapting the invention to a former-type machine, any convenient mechanism may be adopted, such for instance as illustrated in Figures 8 to 10 inclusive, where the tool 19 is mounted on a head 20 which, during successive reciprocations of the tool, is caused to move longitudinally of a stationary tooth form 21 that imparts to the tool a corresponding position during the cutting operations and thereby determines the profile of the tooth. To carry out the present invention in such a mechanism, the head 20 and tool carrying parts may be mounted on a movable table 22, provided with a projection 23 engaging a slot or guideway which includes a straight portion 24 and an inclined portion 25. The table 22 with the head 20 may be reciprocated endwise of a tooth on the gear face, by any suitable mechanism, and as it approaches the center of the gear face, see Figure 9, the projection 23, which initially travels in the straight slot 24, is guided by the inclined slot 25, causing a corresponding travel of the tool 16 outwardly toward the gear face, and thus forming an end portion on the tooth of decreasing depth. It will be understood that the outward travel of the tool 16, just referred to, does not in any manner affect the normal controlling operation of the form 21, and the same profile will be produced on the reduced portion of the tooth as on the body portion, at any given point between the top and bottom of the tooth owing to the perpendicular relationship between the cutting edge and the axis of the projection 23, about which the tool head swings.

The invention may be carried out in other ways and by other mechanisms than those specifically set forth, and this application is intended to cover any modifications or structural departures embodying the process herein set forth, or coming within the scope of the following claims.

I claim:

1. The method of forming a herringbone gear consisting in moving a tool with reference to a blank in such a manner as to form a tooth having an effective end portion located adjacent to the center of the gear face and of gradually reduced depth.

2. The method of forming a herringbone gear consisting in moving a tool in such a manner with reference to a blank as to afford a tooth with an end portion that is of gradually reduced depth and terminates at the center of the gear face.

3. The method of forming a herringbone gear consisting in moving a tool in such a manner with reference to a blank as to afford a tooth having a body portion, and an end portion of gradually reduced depth located adjacent to the center of the gear face, the curvature of the tooth being the same throughout the body and end portions.

4. The method of forming a herringbone gear consisting in moving a tool in such a manner with reference to a blank as to afford a tooth having a body portion, and an end portion of gradually reduced depth terminating at the center of the gear face, the thickness of the tooth measured at any points on the pitch line or any line parallel thereto being uniform throughout the body and end portions.

5. The method of forming a herringbone gear consisting in moving a tool in a direction parallel to the gear face to form the body portion of a tooth, and moving the tool outwardly toward the gear face as it approaches the center of the gear face to form the end portion of the tooth.

6. The method of forming a herringbone gear consisting in moving a tool in a direction parallel to the gear face to form the body portion of the tooth, and imparting to said tool during its final cutting action a combined motion toward the center of the gear face and outwardly toward the gear face to form an end portion on the tooth of gradually reduced depth.

7. The method of forming a herringbone gear consisting in forming a tooth with a body portion of uniform depth and an end portion located at the center of the gear face of gradually decreasing depth by a cutting element which forms the reduced end portion by moving outwardly toward the gear face about an axis perpendicular to the cutting edge of said element.

8. The method of forming a herringbone gear consisting in moving a tool in a direction parallel to the gear face to form the body portion of a tooth, and swinging said tool outwardly toward the gear face as it approaches the center of the gear face, such outward swinging movement taking place about an axis perpendicular to the cutting edge of the tool.

9. The method of forming a herringbone gear which consists in cutting a tooth of varying depth by moving a tool from the root of the tooth outwardly about an axis perpendicular to the cutting edge of the tool.

10. The method of forming a herringbone gear consisting in constructing a tooth of varying depth by moving a tool from the root of the tooth outwardly toward the gear face in such a manner as to form a profile of constant curvature.

11. The method of forming a herringbone gear consisting in cutting a tooth of varying depth by moving a tool from the root of the tooth outwardly toward the gear face in such a manner as to afford a tooth of uniform thickness measured at any points on the pitch line or any line parallel thereto.

12. The method of forming a herringbone gear consisting in cutting teeth correspondingly arranged in pairs on the opposite sides of the gear face, each pair of teeth having end portions of gradually reduced depth which meet at the center of the gear face, and cutting away the face of the gear so that the tops and bottoms of the respective teeth are similarly formed at the center.

13. The method of forming a herringbone gear which consists in constructing a tooth with a body portion of uniform depth and an end portion of gradually reduced depth, by moving a tool outwardly toward the face of the gear about an axis perpendicular to the cutting edge of the tool and simultaneously effecting relative rolling motion between the tool and bank.

14. The method of forming a herringbone gear consisting in constructing a tooth of varying depth by moving a tool outwardly toward the face of the gear in such a manner as to maintain a uniform curvature throughout the length of the tooth, and simultaneously effecting a relative rolling motion between the tool and blank.

15. A machine for cutting a herringbone gear, comprising a tool which travels parallel to the gear face to form a body portion of the tooth and outwardly toward the gear face to form an end portion of reduced depth.

16. A machine for cutting a herringbone gear comprising a tool which travels lengthwise of the tooth to form a body portion and outwardly toward the gear face to form an end portion of reduced depth, the outward travel of the tool taking place about an axis perpendicular to the cutting edge of the tool.

17. A machine for forming herringbone gears comprising a tool in which the cutting element travels from one edge of a gear face to the center thereof, the final movement of the cutting element being outwardly toward the gear face about an axis perpendicular to the cutting edge.

In witness whereof, I have hereunto signed my name.

ERNEST C. HEAD.